United States Patent [19]

Ueno

[11] 4,409,846
[45] Oct. 18, 1983

[54] ELECTROMAGNETIC FLOW METER

[75] Inventor: Kazuo Ueno, Chita, Japan

[73] Assignee: Aichi Tokei Denki Co., Ltd., Chita, Japan

[21] Appl. No.: 175,611

[22] Filed: Aug. 6, 1980

[30] Foreign Application Priority Data

Feb. 8, 1979 [JP] Japan .................................. 54-13916
Mar. 16, 1979 [JP] Japan .................................. 54-31596

[51] Int. Cl.³ .............................................. G01F 1/60
[52] U.S. Cl. ............................... 73/861.17; 73/861.12
[58] Field of Search ......................... 73/861.12, 861.17

[56] References Cited

U.S. PATENT DOCUMENTS 3,783,687  1/1974  Mannherz et al. ................ 73/861.17
4,204,240  5/1980  Schmoock ..................... 73/861.12 X
4,210,022  7/1980  Boss .................................. 73/861.17
4,227,408  10/1980 Schmoock et al. .............. 73/861.17
4,236,410  12/1980 Appel et al. ..................... 73/861.12

Primary Examiner—Charles A. Ruehl
Attorney, Agent, or Firm—Pollock, Vande Sande & Priddy

[57] ABSTRACT

An electromagnetic flow meter with less power consumption in which an instantaneous pulsate current with alternately changing polarity at given intervals is fed into an exciting coil, and a velocity of flow of fluid is calculated by using a voltage produced between electrodes in accordance with a residual magnetic flux of a magnetic circuit and a flow velocity of the fluid when no exciting current flows.

14 Claims, 22 Drawing Figures

→ TIME

ELECTROMAGNETIC FLOW METER

The present invention relates to an electromagnetic flow meter which has a pair of electrodes facing each other for directly sandwiching at least part of a conductive fluid and a magnetic circuit for developing a magnetic flux crossing a straight line connecting both the electrodes and the flow of the conductive fluid whereby a velocity of flow of a fluid is calculated by using a voltage developed between both the electrodes in accordance with the magnetic flux of the magnetic circuit and the flow of the fluid.

In the electromagnetic flow meter, the use of a permanent magnet for forming a magnetic circuit is ideal when attention is given to only the reduction of power consumption. The permanent magnet, however, is rarely used since the voltage polarities of both the electrodes are invariable and contact voltage and polarized voltage are produced by an electrochemical action, thus bringing about a great zero shift or drift.

The use of a magnetic circuit by AC excitation solves the just-mentioned problem. This approach, however, is accompanied by 90° noise. The summation of it with the common mode noise does not necessarily provide a phase difference of 90°. Therefore, it is difficult to check the zero point during the course of the fluid flow.

When a magnetic circuit that is magnetically excited by a square wave current with alternately changing polarities is used, the difficulty in the case of using a permanent magnet is not involved and an amount of the zero shift during the flow of the fluid may be obtained from the average of those values obtained when there is not flux change with respect to both the current directions. Therefore, correction may be realized by using the zero drift obtained. This approach, however, has a circuit design to make the exciting current constantly flow. The result is a large power consumption.

The above-mentioned prior art is disclosed in U.S. Pat. Nos. 3,783,687, 3,802,262, 3,894,430, 4,010,644 and 3,777,561.

Accordingly, an object of the present invention is to provide an electromagnetic flow meter with less power consumption.

Another object of the present invention is to provide an electromagnetic flow meter able to stably measure the velocity of flow of a fluid which is free from an error due to a change of ambient temperature.

Yet another object of the present invention is to provide an electromagnetic flow meter which is insensitive to a variation of a power source voltage.

One of the features of the present invention produces, in a magnetic circuit, a square wave magnetic flux with alternately changing polarities which continue for a slight amount of time in each cycle but intermittently, thereby ensuring the advantage of the conventional electromagnetic flow meter. Another feature, which provides a reduction of power consumption, causes a magnetic exciting current into a magnetic exciting coil. The current is intermittent and instantaneous (i.e. short time) in each cycle with alternately changing polarities, and calculates a velocity of flow of a fluid by using a voltage produced in accordance with a residual magnetic flux which is held in the magnetic circuit and a flow velocity of the fluid when no magnetic exciting current flows therethrough.

The above and other objects, features and advantages of the present invention will be more clear from the following description with reference to the accompanying drawings, in which.

Figure 1:
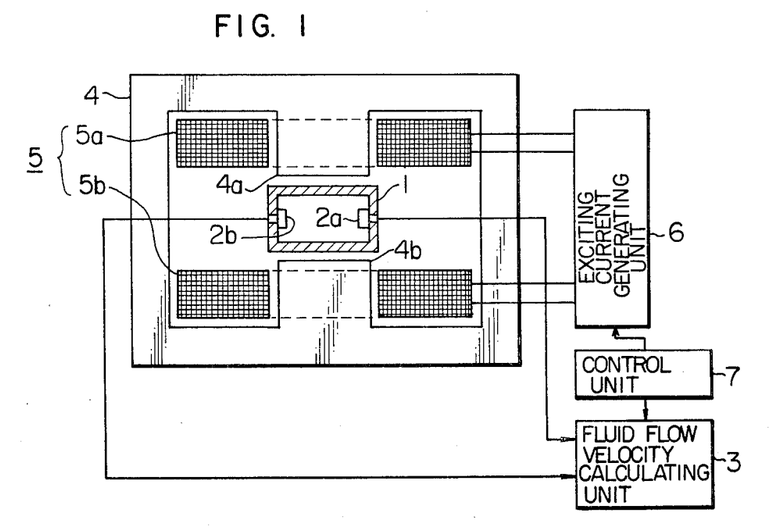
FIG. 1 is a schematic diagram of a first embodiment of the present invention.

FIG. 1 is a schematic illustration of a first embodiment of the present invention and, more particularly a cross sectional view orthogonal to a flow direction of a fluid. A pipe 1 for fluid, made of non-magnetic and non-conductive material, extends over an extreme range near the cross section but along the longitudinal direction relative to the cross section. There are provided electrodes 2a and 2b on the inner walls of the pipe 1, which are oppositely disposed while directly sandwiching part of the fluid flow and exposed to the fluid. The electrodes 2a and 2b are connected to a fluid flow velocity calculating unit 3 for calculating the velocity of a fluid flow by using a voltage between both the electrodes 2a and 2b, by way of conductive portions which water-tightly pass through the side walls of the pipe 1, respectively.

A magnetic circuit 4 with magnetic poles 4a and 4b sandwiching the pipe 1 is provided to develop between the magnetic poles 4a and 4b, a magnetic flux crossing a straight line connecting both the electrodes 2a and 2b and the flow of the fluid.

Preferable material of the magnetic circuit 4 has an easily magnetized characteristic with a high permeability but with a relatively high coercive force. The embodiment employs usual steel.

The magnetic poles 4a and 4b have respectively exciting coils 5a and 5b wound therearound for exciting the magnetic circuit 4. The exciting coils each have a large diameter with the total resistance being small.

Both the exciting coils 5a and 5b are connected in series and coupled to an exciting current generating unit 6 for feeding exciting current to the coil which is intermittent and instantaneous (for a short time) and is alternately changed in current direction.

Figures 2, 6:
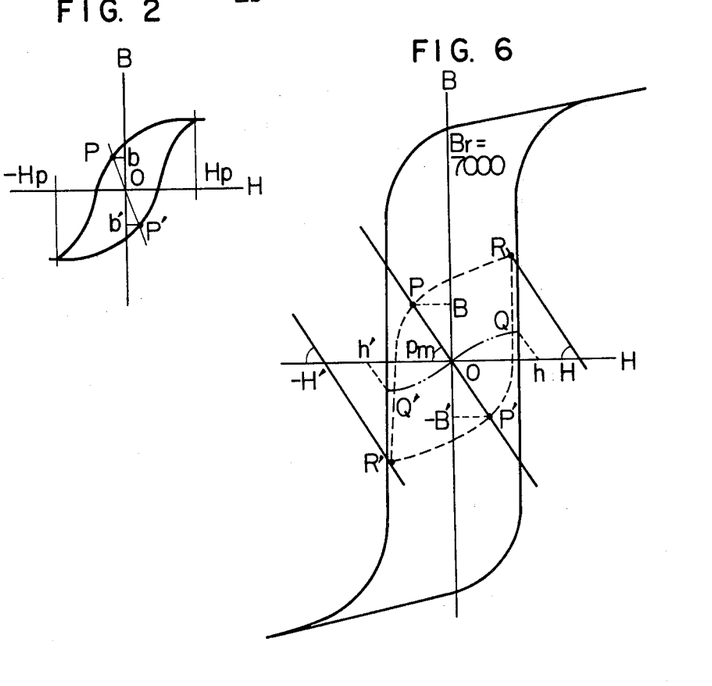
FIG. 2 is a graphical representation representing a relation between a magnetic field and a magnetic flux.
FIG. 6 is a graph illustrating a relation between a magnetic field and a magnetic flux in connection with the second embodiment.

When the exciting current produces magnetic fields +Hp and −Hp, developed in the magnetic circuit 4, magnetic density B, developed between the magnetic poles 4a and 4b, varies as indicated by a curve in FIG. 2. When the exciting current reduces to zero, the magnetic field passes a point of O and is settled down at a point P or P' in the figure, because the permeance between the magnetic poles 4a and 4b is small. Under this condition the magnetic flux density B is depicted by line segments $\overline{Ob}$ and $\overline{Ob'}$ in the figure.

To enlarge the residual magnetic flux, it is preferable to form a rectangular cross section of pipe 1 and to narrow a gap between the magnetic poles 4a and 4b, thereby enlarging permeance.

The exciting current generating unit 6 and the fluid flow velocity calculating unit 3 are both responsive to pulses delivered from a control unit 7 which produces given signals in response to pulses generated from a single oscillator, and periodically operates with a fixed time relation.

The control unit 7 is comprises of an oscillator 72 for producing a signal with a given frequency, a frequency divider 74 for dividing the frequency, and a gate circuit 76. Signals $PS_1$ and $PS_2$ for controlling switches $S_1$ and $S_2$ (discussed hereinafter) a signal SP for controlling a sampling circuit 32 and a signal SR' for controlling a synchronous rectifier 34 are produced with a predetermined interrelation in timing by the divider 74. These signals are transmitted through the gate circuit 76.

Figure 3:
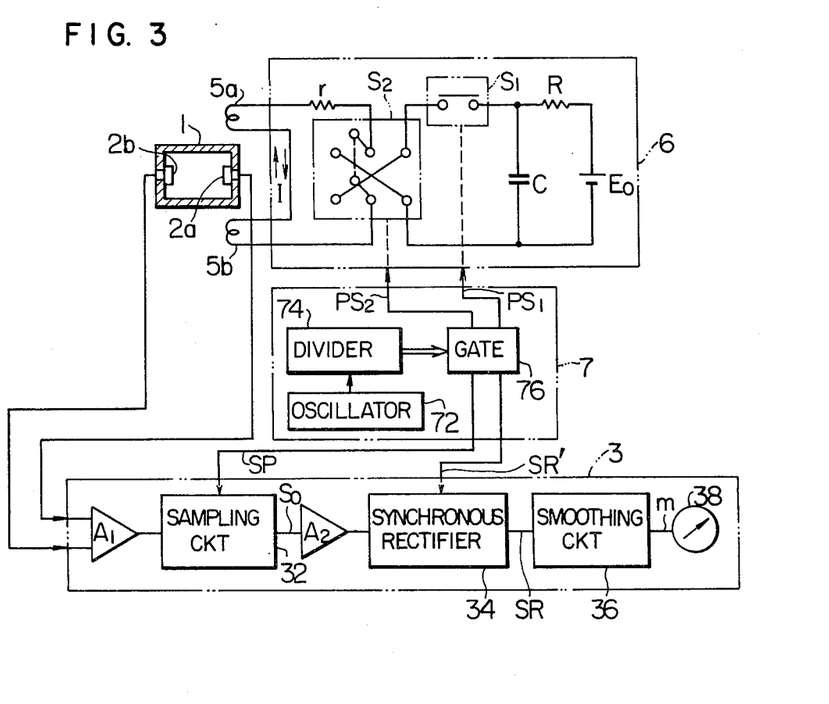
FIG. 3 is a circuit diagram representing the first embodiment of the present invention.
Figure 4A:
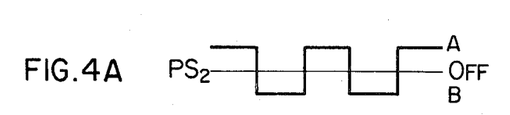
FIG. 4A is a waveform illustrating the operating state of switch $S_2$ shown in FIG. 3.
Figure 4B:
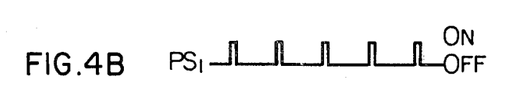
FIG. 4B illustrates the waveform of the operating states of switch $S_1$ shown in FIG. 3.
Figure 4C:
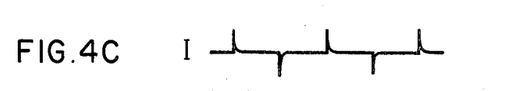
FIG. 4C is a waveform illustrating the exciting current I flowing through exciting coils 5a and 5b illustrated in FIG. 3.

The exciting current generating unit 6, like a circuit on the upper half of FIG. 3, has a fixed resistor r with much greater resistance than that of coils 5a and 5b. Resistor r is inserted in series in a series circuit of the exciting coils 5a and 5b, in order to substantially eliminate adverse influence by a temperature change of the cooper resistance of the exciting coils. A series connection including a capacitor C and a normally open switch $S_1$ with a short closed time is further provided. Both ends of the series connection are connected between both ends of a series connection including the coils 5a and 5b and fixed resistor r, through a polarity inverting switch $S_2$. The capacitance C is connected across a series circuit including a resistor r with a high resistance and a stabilizing DC power source. In practical use, the switch $S_1$, having close duration of a short time, and the polarity inverting switch $S_2$ may be constructed by electronic circuits having equivalent functions, which operate under control of periodic pulses $PS_1$ and $PS_2$ produced by the control unit 7. The operating states of switches $S_1$ and $S_2$ are illustrated in FIGS. 4(A) and 4(B), in which the abscissa represents time and the ordinate represents the operating states of the switches $S_1$ and $S_2$. As shown, the connecting polarity of the switch $S_2$ is periodically inverted and the short-time close switch $S_1$ is closed for a very short time in the midportion of each polarity continuing period, and then is opened immediately.

Figure 4D:
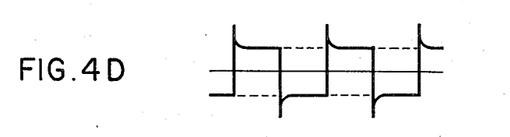
FIG. 4D is a waveform illustrating residual magnetic flux produced in magnetic poles 4a and 4b illustrated in FIG. 3.
Figure 4E:
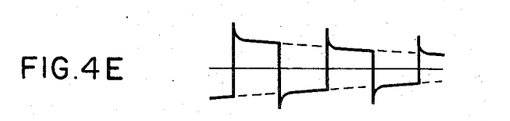
FIG. 4E is a waveform of a voltage produced between electrodes 2a and 2b illustrated in FIG. 3.

As a result of such a switching operation, an exciting current I flows through the exciting coils 5a and 5b, the current having a recurring pulse waveform with alternating opposite polarities. The result is that, as seen from the graph of FIG. 2, a residual magnetic flux is produced in the magnetic poles 4a and 4b, the waveform of which has a substantially fixed amplitude following a sharp leading edge, as shown in FIG. 4(D).

Where flow velocity of the fluid in pipe 1 gradually decreases, FIG. 4(E) illustrates that a voltage is produced between the electrodes 2a and 2b which changes in proportion to the product of the signal shown in FIG. 4(D) and the decreasing flow velocity shown dotted in FIG. 4(E).

Figure 4F:
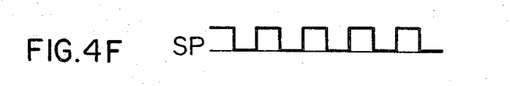
FIG. 4F is a waveform of the sampling pulses received by sampling circuit 32 shown in FIG. 3.
Figure 4G:
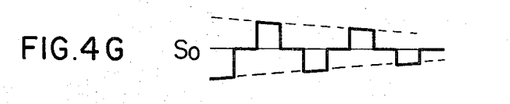
FIG. 4G illustrates the output waveform from the sampling circuit 32.
Figure 4H:
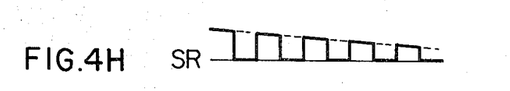
FIG. 4H is a waveform of the output from a synchronous rectifier 34 illustrated in FIG. 3.
Figure 4I:
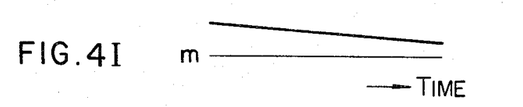
FIG. 4I is a waveform illustrating the output from smoothing circuit 36 illustrated in FIG. 3.

The detail of the fluid flow velocity calculating unit 3 is illustrated in block form in the lower half of FIG. 3. The voltage between the electrodes 2a and 2b is amplified by a first amplifier $A_1$ and is applied to a sampling circuit 32. The sampling circuit 32 receives sampling pulses SP as shown in FIG. 4(F), and the sampling pulses SP define such a relation between the pulses $PS_1$ and $PS_2$ so that the portion of the wave form of FIG. 4(E), at which the residual magnetism is already stable, can be sampled but the portion of the wave form of FIG. 4(E), at which the residual magnetism is sharply changed, can not be sampled. By such sampling pulses, the sampling circuit 32 produces from the output of the first amplifier $A_1$, an output signal, the wave form of which has different amplitudes and alternately changing polarity. The output signal from the sampling circuit 32 is amplified by a second amplifier $A_2$ and is synchronously rectified by the synchronous rectifier 34, to obtain intermittent outputs changing proportionally to the flow velocity of the fluid, as indicated by SR of FIG. 4(H). The intermittent outputs with a fixed polarity are time-averaged by a smoothing circuit 36 to obtain a smoothed change, as indicated by m in FIG. 4(I), which in turn transfers the information of an instantaneous flow speed to a meter 38. In FIGS. 4(D), 4(E), 4(G) and 4(H), dotted lines indicate tendencies of changes of the upper and lower limit values.

With the above-mentioned construction, by properly selecting the frequency of the exciting current, which is determined by the output pulse from the control unit 7, it is possible to restrict the zero shift, which is due to electrochemical effects at the electrodes 2a and 2b when no exciting current flows. The restriction may be made to a practical allowance, and the average flow velocity over an entire range of the flow velocity measuring time may be made substantially equal to the average flow velocity only during the sampling pulses, even if there is a flow velocity variation during the period other than the sampling pulse period.

In the electromagnetic flow meter of the first embodiment according to the invention, period of the exciting current is a very short-time, so that the power consumption is extremely small thereby attaining the object as mentioned above.

Since the polarity of the voltage between the electrodes 2a and 2b is inversed each cycle, it is not feared that a great zero shift is caused by electrochemical action. Further, the measurement of the change of the residual magnetic flux is made only during the period which is negligible from a practical viewpoint. Therefore, it is easy to check the zero point even if the fluid is flowing.

The influence of a change of the resistance value of the exciting coil, which is caused by the change of ambient temperature, upon the magnitude of the residual magnetic flux, may be reduced to be extremely small by connecting an exciting coil in series with a temperature compensating resistor having a small resistance temperature coefficient but a large resistance. Unless the material forming the magnetic circuit is properly selected, however, the residual magnetic flux changes from variations of ambient temperature, even if a means to make the exciting current constant is used. This results in an error in the measured flow velocity.

A second embodiment of the present invention is directed to overcome the above-mentioned defect of the electromagnetic flow meter of the intermittent (i.e. short time), inverting and exciting type. In this embodiment, the magnetic circuit is comprised of a yoke made of high permeability material with low residual magnetic flow and a magnetic member of permanent magnetic material, both being coupled in series with each other.

Figure 5:
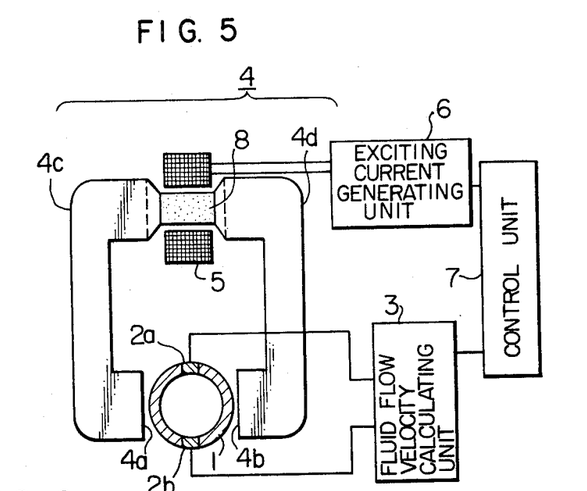
FIG. 5 is a schematic diagram of a second embodiment of the present invention.

FIG. 5 shows a schematic diagram of the second embodiment of the invention with the cross sectional view orthogonal to the flow of a conductive fluid. In the figure, like numerals are used to designate like or equivalent portions or parts in the first embodiment. The pipe 1 for fluid, which is non-magnetic and non-conductive, extends over a necessary long range in the longitudinal direction of the cross section. Electrodes 2a and 2b are provided which are disposed oppositely sandwiching at least part of the flow of the fluid and exposed to the interior of the pipe 1. The electrodes 2a and 2b are connected through conductive portions which water-tightly pass through the walls of the pipe 1, to the flow velocity calculating unit 3 which calculates the flow velocity of the fluid.

Yokes 4c and 4d, having magnetic poles 4a and 4b with the pipe 1 intervening therebetween, are made of high permeability material with low residual magnetic flux such as electromagnetic soft iron or silicon steel plate. The magnetic flux developed between the magnetic poles 2a and 2b crosses a straight line connecting both the electrodes 2a and 2b and the fluid flow. The yokes 4c and 4d hold therebetween a magnetic member 8, for example, casting ALNICO, for which the coercive force is not so large. The magnetic flux steeply rises and the magnetic saturation is rapid, thereby forming a single magnetic circuit 4.

The magnetic member 8 is wound by the exciting winding 5 to excite the magnetic circuit 4, of which the diameter is large and the overall resistance is small, as in the first embodiment. The exciting coil 5 is connected to the exciting current generating unit 6 which is similar to that shown in FIG. 3.

A relation between a magnetic field and flux density, when the permanent magnet material constituting the magnet member 8 is placed in a magnetic field which reciprocally changes with a sufficiently large width, is plotted by a continuous line in FIG. 6, in this example.

In the magnetic circuit 4 of the embodiment in FIG. 5, permeability of the yokes 4c and 4d is 8,000 to 12,000 times that of a gap between the magnetic poles 4a and 4b. Therefore, a magnetomotive force developed in the gap by the current flowing through the exciting coil 5 is practically equal to that applied between the end surfaces of the magnet member 8. Accordingly, a relation of the magnetic flux to the magnetic field caused by the magnetic flux is determined by a value which is a conversion of the permeance Pg between the magnetic poles 4a and 4b into a permeance coefficient Pm of the magnet member 8 which is made by using a relation Pm=Pg×lm/Sm where lm and Sm are a length and a cross sectional area of the magnet member 8 respectively. The permeance between the magnetic poles 4a and 4b is geometrically determined and hence the relation of the flux density of the magnet member 8 to the magnetic field caused by it is fixed and may be expressed by slanted line P-P′ in FIG. 6.

When a change of the magnetic field H produced in the magnet member 8 by the current flowing through the exciting coil 5 by the exciting current generating unit 6 falls within a range from +h to −h′ in FIG. 6, the relation between the magnetic field H and the magnet member changes along a two-dot chain line Q-Q′ in FIG. 6. When it falls out of the range but within the range +H to −H, it changes along broken line R-P-R′-P′. Therefore, when no exciting current flows through the exciting coil 5, points P and P′, which are crosspoints the line R-P-R′-P′ and the slanted line P-P′, are stable and the residual magnetic flux at this time is B or -B′. If both the exciting currents are equal to each other, B=B′.

As seen from the relation Pm=Pg×lm/Sm, the permeance Pm is larger as the cross sectional view Sm of the magnetic member 8 is selected smaller, and the slanted line P-P′ more steeply slants and the absolute values of the residual magnetic densities B and B′ become larger.

As described above, in the second embodiment of the magnetic flow meter, the magnetic circuit 4 is constructed by coupling the yokes 4c and 4d which are made of high permeability material with high residual magnetic flux in series with the magnet member 8 of permanent magnet. Accordingly, the influence of the temperature change on the residual magnetic flux is determined only by the magnet member 8. In the case of the permanent magnet material for the magnetic member 8, a variation of the residual flux density is extremely small, for example, -(0.06 to 0.02)%/°C. Therefore, only a small variation of the magnetic flux in the gap between the magnetic poles 4a and 4b exists. As a result, the defect of the first embodiment, namely, the ambient-temperature change which causes an error in the measured flow velocity is removed.

Figure 5A:
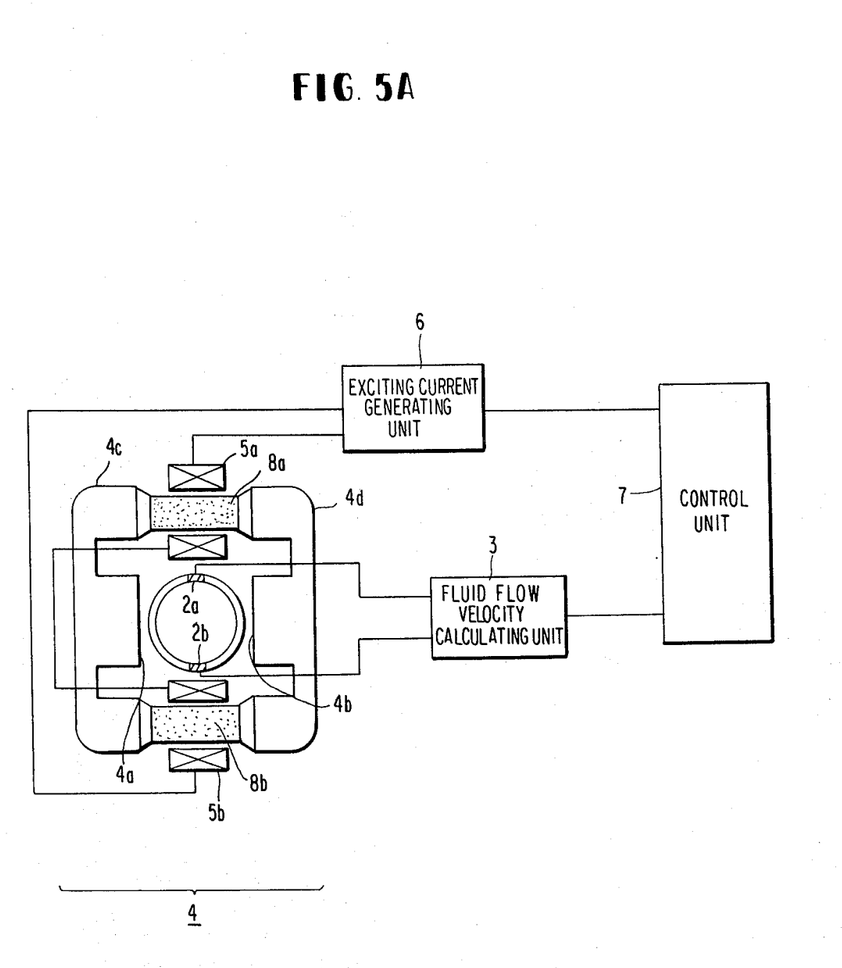
FIG. 5A is a modification of the embodiment shown in FIG. 5.

In the embodiment of FIG. 5 a single magnetic circuit sandwiching a single permanent magnet is shown, and the embodiment can be modified, as shown in FIG. 5A, which illustrates therefor a construction including two magnetic circuits, each of which sandwiches a respective permanent magnet. The two magnetic circuits are symmetrically arranged with respect to a centrally arranged pipe. Identical numerals are employed for corresponding parts in FIGS. 5 and 5A.

A modification of the second embodiment as mentioned above is illustrated in FIGS. 7 and 8 which are its cross sectional view and its longitudinal view. As shown, the gap between the magnetic poles 4a and 4b is narrowed by partially flattening the cross section of the fluid section of the fluid path of the pipe 1, thereby increasing the permeance of the magnetic circuit 4. Magnet members 8a and 8b and exciting windings connected in series to each other are provided. The yoke is comprised of portions 4c and 4d between the magnetic poles 4a and 4b and one end of the magnetic members 8a and 8b, and a portion 4e between the other ends of the magnet members 8a and 8b. Parts 4c, 4d and 4e as well as the lead wires of the exciting coils 5a and 5b and the electrodes 2a and 2b, when the pipe 1 is molded by plastic of non-magnetic and insulating material, are at the same time held in place by an insert molding method. Provided on the upper side of the pipe 1 is a single processing unit 9 integrally including the exciting current generating unit 6 connected to the exciting coils 5a and 5b, the flow velocity calculating unit 3 connected to the electrodes 2a and 2b, a battery, and an oscillator.

Figure 7:
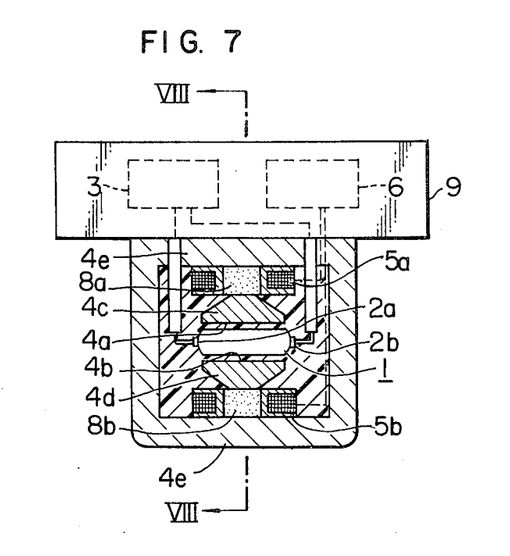
FIG. 7 is a cross sectional view of a modification of the second embodiment.
Figure 8:
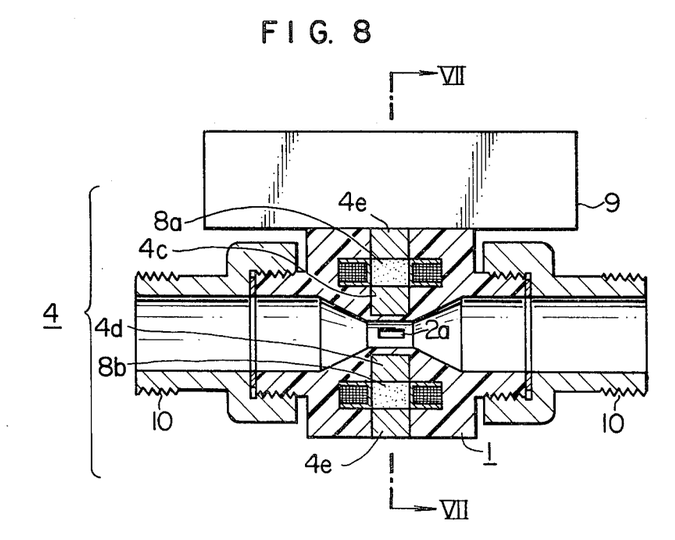
FIG. 8 is a longitudinal sectional view taken along line VIII—VIII in FIG. 7.

The pipe 1 is hermetically screwed at both ends into a metal coupling piece 10 and is coupled with the related tubing by the screw of the coupling piece 10. The pipe 1 has a tensile strength enough to withstand stretching in the longitudinal direction when it is installed.

In this modification as mentioned above, the magnetic circuit 4 may be designed to be small as a whole keeping the satisfactory residual flux density by properly designing the magnetic members 8a and 8b and the yokes 4e, 4c and 4d. This leads to cost reduction.

Figure 9:
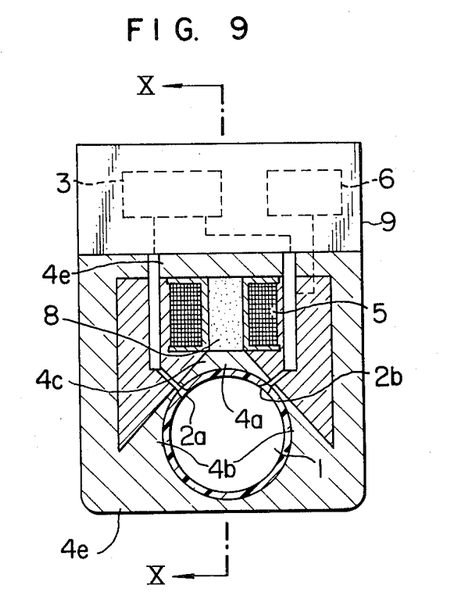
FIG. 9 is a cross sectional view of a further modification of the second embodiment.
Figure 10:
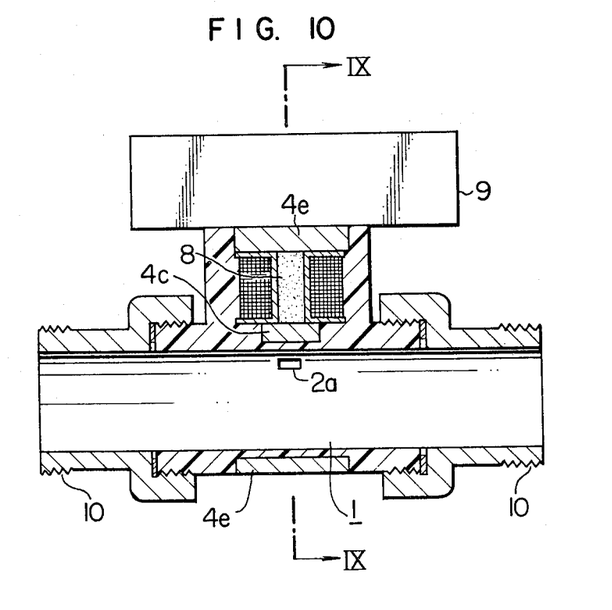
FIG. 10 is a longitudinal sectional view taken along line X—X in FIG. 9.

The first and second embodiments of the present invention are applicable for an electromagnetic flow meter with an arrangement that the electrodes 2a and 2b and the magnetic electrodes 4a and 4b are disposed symmetrically with respect to the cross section of the pipe 1 as viewed horizontally but assymetrically disposed as viewed vertically. Such an arrangement is illustrated in FIG. 9 of the cross section and in FIG. 10 of the longitudinal section.

The first embodiment of FIGS. 1 and 3 and the second embodiment of FIGS. 5, 7 and 8 have a drawback. When the stabilizing DC power source is not employed for the power source Eo of the exciting current generating unit 6, the peak value of the exciting current (FIG. 4(D)) and thus the average value (FIG. 4(I)) varies due to the variation of the voltage independently of an actual instantaneous flow velocity of the fluid.

A third embodiment of the invention to be described hereinafter aims at overcoming the just-mentioned drawback in the electromagnetic flow meter of the intermittent, inverting, and instantaneous (short time) exciting type. In this embodiment, in the instantaneous rise process of the exciting current in each cycle, when the absolute value thereof exceeds a fixed value, it is immediately reduced to zero.

Figure 11:
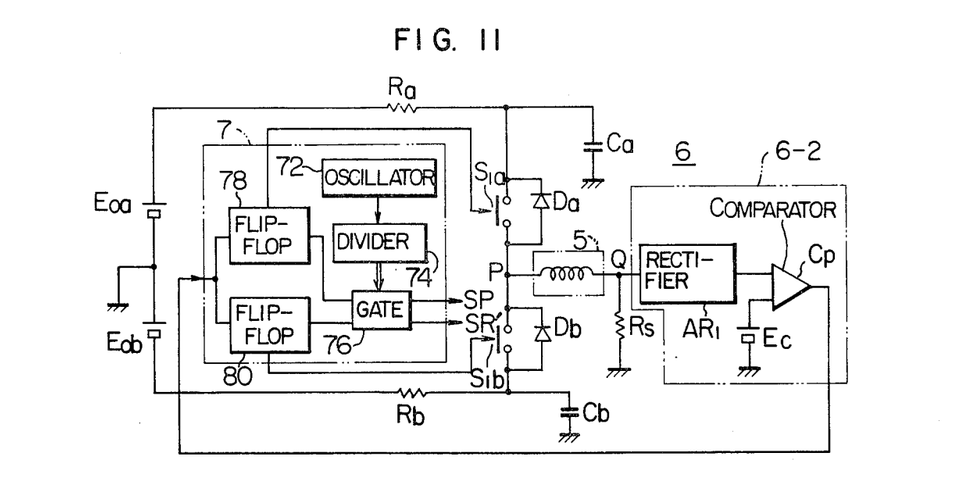
FIG. 11 is a circuit construction of a third embodiment of the present invention, wherein electrodes and a fluid flow velocity calculating unit are omitted because they are the same as the first embodiment.

FIG. 11 of the third embodiment illustrates the circuit of the exciting current generating unit 6, together with the control unit 7 and the exciting coil 5.

The third embodiment also has electrodes and a fluid flow velocity calculating unit similar to that of FIG. 3 though they are omitted in FIG. 11. Therefore, the output signals SP and SR' of the control unit 7 are applied to the sampling circuit 32 and the synchronous rectifier 34 respectively.

The control unit 7 is composed of a pulse generating circuit comprising the oscillator 72 for generating pulses with a predetermined frequency, the divider 74 for dividing the frequency and the gate circuit 76 and first and second flip-flops 78 and 80. The signal SP for controlling the sampling circuit 32 of the calculating unit 3 and the signal SR' for controlling the rectifier 34 are produced by the divider 74 with a predetermined timing relation therebetween as stated with regard to FIG. 4, and transmitted to the sampling circuit 32 and the rectifier 34 respectively through the gate circuit 76. The first and second flip-flops 78 and 80 alternately receive a set signal with a fixed interval of time through the divider 74 and the gate circuit 76 in accordance with the first and second switches $S_{1a}$ and $S_{2a}$. The flip-flops 78 and 80 receive an excess signal from a reference-exceeding value detecting circuit 6-2 which is described hereinafter as a reset signal. Thus, the first or second switch $S_{1a}$ or $S_{1b}$ receives a signal from the corresponding flip-flop to be closed only during the period from receiving of the set signal to receiving of the reset signal.

The exciting current generating unit 6 as shown in FIG. 11 is comprised of a first series connection of a normally open switch $S_{1a}$ and a capacitor Ca. A second series connection exists between a normally open switch $S_{1b}$ and a capacitor Cb. The first and second series connections are each connected in parallel to the series connection of the exciting coil 5 and a resistor Rs. Respective series connections exist for DC power source Eoa, resistor Ra, capacitor Ca, as well as source Eob, resistor Rb and capacitor Cb. The first and second capacitors Ca, Cb are charged with opposite polarities to obtain opposite current flows into the exciting coil 5 when the first and second normally open switches $S_{1a}$, $S_{1b}$ are selectively closed. A first diode Da is connected to the first normally open switch $S_{1a}$, in parallel, and in reverse polarity with respect to the potential of the first capacitor Ca. A second diode Db is connected to the second normally open switch $S_{1b}$, in parallel, and in reverse polarity with respect to the potential of the second capacitor Cb. The control unit 7 controls the first and second normally open switches $S_{1a}$, $S_{1b}$ so as to be alternately closed for a short time at a predetermined constant timing.

An electronic circuit for achieving switching operation and equivalent to that of the switches $S_{1a}$ and $S_{1b}$ may be used for the normally open switches $S_{1a}$ and $S_{1b}$. Each of the diodes Da and Db closes as surge voltage is produced by the exciting coil 5 immediately after each of the switches $S_{1a}$ and $S_{1b}$ is opened, and current is fed back to each of the capacitors Ca and Cb by each of the diodes Da and Db.

One end of the stabilizing resistor Rs is connected to ground. Therefore, the potential at the other terminal Q changes in accordance with the exciting current flow.

In the embodiment shown in FIG. 11, the potential at the point Q is applied to an absolute rectifier $AR_1$ which converts it into a positive potential which is proportional to its absolute value irrespective of the polarity thereof. The output of the rectifier is applied to the negative input terminal of a comparator CP. A fixed reference voltage relative to the ground potential is applied to the input terminal of the comparator CP, from a reference voltage supply Ec. The comparator CP produces an output signal when the input signal at the negative input terminal exceeds that at the positive input terminal. Every time the flip-flops of the control unit 7 receive this output from the comparator CP, they control the first or second switch $S_{1a}$ or $S_{1b}$ to immediately open if the switch is closed. By the absolute rectifier $AR_1$, the comparator CP and the reference voltage supply $E_c$, a reference-exceeding value detecting circuit 6-2 for detecting the fact that the exciting current exceeds the reference voltage is composed.

In FIG. 11, the first and second DC power sources $E_{oa}$ and $E_{ob}$, a connection point of which is grounded, and the resistors $R_a$ and $R_b$ with high resistance may be replaced by a single DC power source E and a single resistor R with high resistance to achieve the same advantage as the circuit of FIG. 3.

Figure 12:
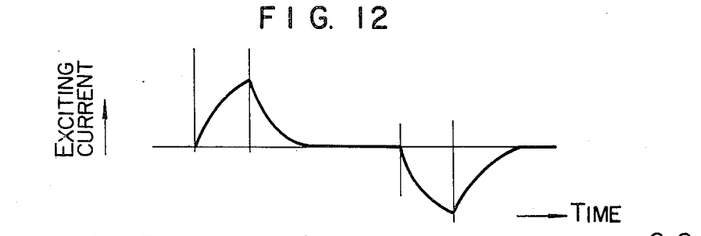
FIG. 12 shows a graph of an exciting current in the third embodiment.

With such a circuit arrangement, due mainly to the inductance of the exciting coil 5, the absolute value of the exciting current increases from zero through a given process and decreases toward zero through a given process when the first or second switch $S_{1a}$ or $S_{1b}$ is closed or opened, as shown in FIG. 12 illustrating the waveforms with respect to an enlarged time scale. The absolute value of the exciting current at an instant that the switch $S_{1a}$ or $S_{1b}$ is opened is at maximum, and it is fixed every cycle with respect to the voltage of the reference voltage supply Ec.

Figure 13:
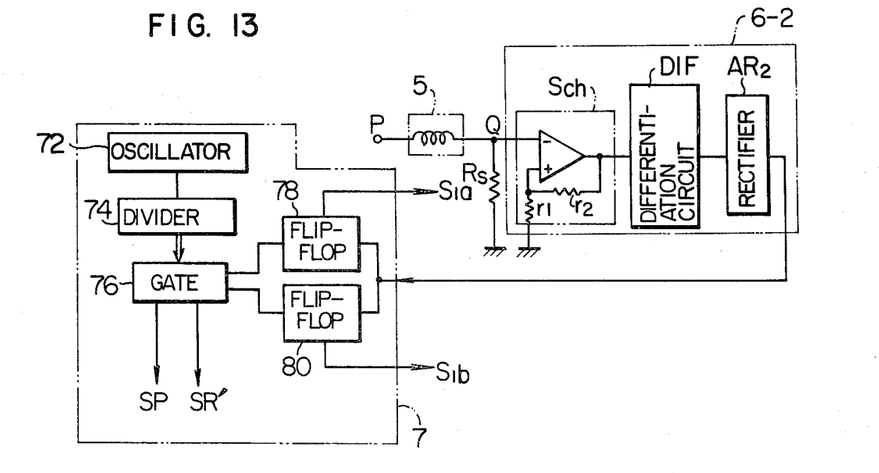
FIG. 13 is a circuit diagram of a modification of part of the third embodiment.

This reference-exceeding value detecting circuit 6-2 in FIG. 11 may be substituted by a circuit arrangement shown in FIG. 13. In FIG. 13, with the provision of a Schmitt trigger circuit, a rectangular waveform is produced, the polarity of which is inverted every time that the exciting current exceeds a constant value which is determined by resistors r1 and r2. This is processed by a differential circuit DIF to form a pulse, the polarity of which changes every time the polarity is changed. The formed pulse is processed by the absolute value rectifier $AR_2$ to form an output signal similar to that from the comparator CP in the circuit shown in FIG. 1. The output signal thus formed is transferred to the flip-flops of the control unit 7.

According to the exciting current generating unit 6 as shown in FIG. 11 or FIG. 13 in which the unit 6 of FIG. 11 is modified, the maximum value of the exciting current is invariable even though the voltage of the first or second DC power source $E_{oa}$ or $E_{ob}$ varies. As a result, the reduction of the measuring accuracy due to the voltage variation may be avoided without using a stabilized DC power source, whereby the above-mentioned drawback may be eliminated.

What is claimed is:

1. In an electromagnetic flow meter having: a pipe of non-magnetic and non-conductive material through which conductive fluid flows; a pair of electrodes which are provided oppositely on said pipe orthogonal to the flow direction of said fluid and in contact with said fluid; a magnetic circuit for introducing magnetic flux in the direction orthogonal to the flow direction and a straight line connecting said electrodes, an exciting coil for producing said magnetic flux to be introduced into said magnetic circuit; an exciting current generating unit for generating exciting current to be supplied to said exciting coil; and a fluid flow velocity calculating unit for calculating fluid flow velocity on the basis of the voltage produced between said electrodes due to said magnetic flux and the fluid flow; said electromagnetic flow meter comprising: a control unit for controlling said exciting current generating unit and said fluid flow calculating unit in such a manner that said exciting current generating unit intermittently produces said exciting current with an alternately reversed polarity and a short time duration and said fluid flow velocity calculating unit calculates the velocity of the fluid flow only during a predetermined constant period from a point in time when the residual flux retained by said magnetic circuit, after extinguishing said exciting current, reaches a stable state to a point in time when the subsequent exciting current is initiated, wherein said exciting current generating unit comprises a first fixed resistor with a large resistance value relative to said exciting coil, connected in series with said exciting coil; a capacitor; a normally open switch connected to said capacitor; a polarity inverting switch, both ends of a series connection of said capacitor and said normally open switch being connected to both ends of a series connection of said exciting coil and said first fixed resistor through said polarity inverting switch; a stabilizing DC power source; and a second fixed resistor with a high resistance value connected to said DC power source in series, said capacitor being connected in parallel with a series connection of said second fixed resistor and said DC power source; and said control unit controls said normally open switch and said polarity inverting switch with predetermined timings respectively in such a manner that a connection polarity of said polarity inverting switch is changed at a predetermined constant timing and said normally open switch is closed for a short time at an intermediate timing of said predetermined constant timing.

2. In an electromagnetic flow meter having: a pipe of non-magnetic and non-conductive material through which conductive fluid flows; a pair of electrodes which are provided oppositely on said pipe orthogonal to the flow direction of said fluid and in contact with said fluid; a magnetic circuit for introducing magnetic flux in the direction orthogonal to the flow direction and a straight line connecting said electrodes, an exciting coil for producing said magnetic flux to be introduced into said magnetic circuit; an exciting current generating unit for generating exciting current to be supplied to said exciting coil; and a fluid flow velocity calculating unit for calculating fluid flow velocity on the basis of the voltage produced between said electrodes due to said magnetic flux and the fluid flow; said electromagnetic flow meter comprising: a control unit for controlling said exciting current generating unit and said fluid flow calculating unit in such a manner that said exciting current generating unit intermittently produces said exciting current with an alternately reversed polarity and a short time duration and said fluid flow velocity calculating unit calculates the velocity of the fluid flow only during a predetermined constant period from a point in time when the residual flux retained by said magnetic circuit, after extinguishing said exciting current, reaches a stable state to a point in time when the subsequent exciting current is initiated, wherein said exciting current generating unit 6 is comprised of a first series connection of a first normally open switch $S_{1a}$ and a first capacitor Ca; a second series connection of a second normally open switch $S_{1b}$ and a second capacitor Cb, said first and second series connections being connected to both ends of said exciting coil 5 in parallel; series connections of DC power sources $E_{oa}$, $E_{ob}$ and resistors Ra, Rb being connected to said first and second capacitors Ca, Cb respectively or in common in such a manner that said first and second capacitors Ca, Cb are charged with opposite polarity to obtain opposite current flows into said exciting coil 5 when said first and second normally open switches $S_{1a}$, $S_{1b}$ are selectively closed; a first diode Da connected to said first normally open switch $S_{1a}$ in parallel and in reverse polarity with respect to the potential of said first capacitor Ca; a second diode Db connected to said second normally open switch $S_{1b}$ in parallel and in reverse polarity with respect to the potential of said second capacitor Cb; and said control unit 7 controls said first and second normally open switches $S_{1a}$, $S_{1b}$ so as to be alternately closed for a short time at a predetermined constant timing.

3. In an electromagnetic flow meter having: a pipe of non-magnetic and non-conductive material through which conductive fluid flows; a pair of electrodes which are provided oppositely on said pipe orthogonal to the flow direction of said fluid and in contact with said fluid; a magnetic circuit for introducing magnetic flux in the direction orthogonal to the flow direction and a straight line connecting said electrodes, an exciting coil for producing said magnetic flux to be introduced into said magnetic circuit; an exciting current generating unit for generating exciting current to be supplied to said exciting coil; and a fluid flow velocity calculating unit for calculating fluid flow velocity on the basis of the voltage produced between said electrodes due to said magnetic flux and the fluid flow; said electromagnetic flow meter comprising: a control unit for controlling said exciting current generating unit and said fluid flow calculating unit in such a manner that said exciting current generating unit intermittently produces said exciting current with an alternately reversed polarity and a short time duration and said fluid flow velocity calculating unit calculates the velocity of the fluid flow only during a predetermined constant period from a point in time when the residual flux retained by said magnetic circuit, after extinguishing said exciting current, reaches a stable state to a point in time when the subsequent exciting current is initiated, wherein a reference-exceeding value detecting circuit is provided for producing an excess signal by detecting the fact that potential of one end of a resistor, which is proportional to said exciting current, exceeds a predetermined reference value, said resistor being connected in series in a circuit into which said exciting current flows, and said control unit having the function of immediately disconnecting the supply of said exciting current generating unit when said control unit receives said excess signal.

4. An electromagnetic flow meter according to claim 3, wherein said control unit comprises first and second flip-flops for controlling first and second normally open switches respectively so as to be closed during a period from receiving a set signal to receiving a reset signal; a pulse circuit for supplying said set signal alternately at a predetermined timing; said first and second flip-flops being connected to said reference-exceeding value detecting circuit to be received with said excess signal therefrom as said reset signal.

5. An electromagnetic flow meter according to claim 3, wherein said reference-exceeding value detecting circuit comprises an absolute rectifier for producing a positive potential proportional to an absolute value in accordance with said potential of one end of said resistor regardless of the polarity of said potential; and a comparator having a minus input terminal connected to the output of said absolute rectifier and a plus input terminal connected to a constant reference voltage source, the output of said comparator being applied to said control unit as said excess signal.

6. An electromagnetic flow meter according to claim 3, wherein said reference-exceeding value detecting circuit comprises a Schmitt trigger circuit having an input terminal for receiving said potential of one end of said resistor for producing a rectangular wave form reversing in polarity when said potential exceeds a predetermined value; a differentiation circuit having an input terminal for receiving the output from said Schmitt trigger circuit for producing pulses alternately changed in polarity whenever the polarity of the output from said Schmitt trigger circuit is changed; and an absolute rectifier for outputting signals with a constant polarity by processing the output from said differentiation circuit, the output of said absolute rectifier being applied to said control unit as said excess signal.

7. An electromagnetic flow meter according to claim 3, wherein said magnetic circuit comprises a pair of magnetic poles, and said exciting coil and poles are substantially symmetrical with respect to a bisector of a straight line connecting said electrodes, which passes through the center of said pipe.

8. An electromagnetic flow meter according to claim 3, wherein said pipe is made of synthetic resin material and is partially flattened at least in the vicinity of a location of said electrodes.

9. In an electromagnetic flow meter having: a pipe of non-magnetic and non-conductive material through which conductive fluid flows; a pair of electrodes which are provided oppositely on said pipe orthogonal to the flow direction of said fluid and in contact with said fluid; a magnetic circuit for introducing magnetic flux in the direction orthogonal to the flow direction and a straight line connecting said electrodes, an exciting coil for producing said magnetic flux to be introduced into said magnetic circuit; an exciting current generating unit for generating exciting current to be supplied to said exciting coil; and a fluid flow velocity calculating unit for calculating fluid flow velocity on the basis of the voltage produced between said electrodes due to said magnetic flux and the fluid flow; said electromagnetic flow meter comprising: a control unit for controlling said exciting current generating unit and said fluid flow calculating unit in such a manner that said exciting current generating unit intermittently produces said exciting current with an alternately reversed polarity and a short time duration and said fluid flow velocity calculating unit calculates the velocity of the fluid flow only during a predetermined constant period from a point in time when the residual flux retained by said magnetic circuit, after extinguishing said exciting current, reaches a stable state to a point in time when the subsequent exciting current is initiated, wherein said magnetic circuit is a yoke made of high permeability material with comparatively high coercive force.

10. In an electromagnetic flow meter having: a pipe of non-magnetic and non-conductive material through which conductive fluid flows; a pair of electrodes which are provided oppositely on said pipe orthogonal to the flow direction of said fluid and in contact with said fluid; a magnetic circuit for introducing magnetic flux in the direction orthogonal to the flow direction and a straight line connecting said electrodes, an exciting coil for producing said magnetic flux to be introduced into said magnetic circuit; an exciting current generating unit for generating exciting current to be supplied to said exciting coil; and a fluid flow velocity calculating unit for calculating fluid flow velocity on the basis of the voltage produced between said electrodes due to said magnetic flux and the fluid flow; said electromagnetic flow meter comprising: a control unit for controlling said exciting current generating unit and said fluid flow calculating unit in such a manner that said exciting current generating unit intermittently produces said exciting current with an alternately reversed polarity and a short time duration and said fluid flow velocity calculating unit calculates the velocity of the fluid flow only during a predetermined constant period from a point in time when the residual flux retained by said magnetic circuit, after extinguishing said exciting current, reaches a stable state to a point in time when the subsequent exciting current is initiated, wherein said magnetic circuit is comprised of a series coupling of a yoke made of high permeability material with low residual magnetic flux and a magnetic member made of permanent magnetic material.

11. In an electromagnetic flow meter having: a pipe of non-magnetic and non-conductive material through which conductive fluid flows; a pair of electrodes which are provided oppositely on said pipe orthogonal to the flow direction of said fluid and in contact with said fluid; a magnetic circuit for introducing magnetic flux in the direction orthogonal to the flow direction and a straight line connecting said electrodes, an exciting coil for producing said magnetic flux to be introduced into said magnetic circuit; an exciting current generating unit for generating exciting current to be supplied to said exciting coil; and a fluid flow velocity calculating unit for calculating fluid flow velocity on the basis of the voltage produced between said electrodes due to said magnetic flux and the fluid flow; said electromagnetic flow meter comprising: a control unit for controlling said exciting current generating unit and said fluid flow calculating unit in such a manner that said exciting current generating unit intermittently produces said exciting current with an alternately reversed polarity and a short time duration and said fluid flow velocity calculating unit calculates the velocity of the fluid flow only during a predetermined constant period from a point in time when the residual flux retained by said magnetic circuit, after extinguishing said exciting current, reaches a stable state to a point in time when the subsequent exciting current is initiated, wherein the cross section of said pipe is substantially circular at least in the vicinity of a location where said electrodes are disposed.

12. In an electromagnetic flow meter having: a pipe of non-magnetic and non-conductive material through which conductive fluid flows; a pair of electrodes which are provided oppositely on said pipe orthogonal to the flow direction of said fluid and in contact with said fluid; a magnetic circuit for introducing magnetic flux in the direction orthogonal to the flow direction and a straight line connecting said electrodes, an exciting coil for producing said magnetic flux to be introduced into said magnetic circuit; an exciting current generating unit for generating exciting current to be supplied to said exciting coil; and a fluid flow velocity calculating unit for calculating fluid flow velocity on the basis of the voltage produced between said electrodes due to said magnetic flux and the fluid flow; said electromagnetic flow meter comprising: a control unit for controlling said exciting current generating unit and said fluid flow calculating unit in such a manner that said exciting current generating unit intermittently produces said exciting current with an alternately reversed polarity and a short time duration and said fluid flow velocity calculating unit calculates the velocity of the fluid flow only during a predetermined constant period from a point in time when the residual flux retained by said magnetic circuit, after extinguishing said exciting current, reaches a stable state to a point in time when the subsequent exciting current is initiated, wherein the arrangement of said magnetic circuit and said exciting coil is substantially symmetrical with respect to a straight line connecting said pair of electrodes.

13. In an electromagnetic flow meter having: a pipe of non-magnetic and non-conductive material through which conductive fluid flows; a pair of electrodes which are provided oppositely on said pipe orthogonal to the flow direction of said fluid and in contact with said fluid; a magnetic circuit for introducing magnetic flux in the direction orthogonal to the flow direction and a straight line connecting said electrodes, an exciting coil for producing said magnetic flux to be introduced into said magnetic circuit; an exciting current generating unit for generating exciting current to be supplied to said exciting coil; and a fluid flow velocity calculating unit for calculating fluid flow velocity on the basis of the voltage produced between said electrodes due to said magnetic flux and the fluid flow; said electromagnetic flow meter comprising: a control unit for controlling said exciting current generating unit and said fluid flow calculating unit in such a manner that said exciting current generating unit intermittently produces said exciting current with an alternately reversed polarity and a short time duration and said fluid flow velocity calculating unit calculates the velocity of the fluid flow only during a predetermined constant period from a point in time when the residual flux retained by said magnetic circuit, after extinguishing said exciting current, reaches a stable state to a point in time when the subsequent exciting current is initiated, wherein said exciting current generating unit 6 is comprised of a first series connection of a first normally open switch $S_{1a}$ and a first capacitor Ca; a second series connection of a second normally open switch $S_{1b}$ and a second capacitor Cb, said first and second series connections being connected to both ends of said exciting coil 5 in parallel; series connections of DC power sources $E_{oa}$, $E_{ob}$ and resistors Ra, Rb being connected to said first and second capacitors Ca, Cb respectively or in common in such a manner that said first and second capacitors Ca, Cb are charged with opposite polarity to obtain opposite current flows into said exciting coil 5 when said first and second normally open switches $S_{1a}$, $S_{1b}$ are selectively closed; a first diode Da connected to said first normally open switch $S_{1a}$ in parallel and in reverse polarity with respect to the potential of said first capacitor Ca; a second diode Db connected to said second normally open switch $S_{1b}$ in parallel and in reverse polarity with respect to the potential of said second capacitor Cb; and said control unit 7 controls said first and second normally open switches $S_{1a}$, $S_{1b}$ so as to be alternately closed for a short time at a predetermined constant timing;

wherein said control unit comprises first and second flip-flops for controlling said first and second normally open switches respectively so as to be closed during a period from receiving a set signal to receiving a reset signal; a pulse circuit for supplying said set signal alternately at a predetermined timing; said first and second flip-flops being connected to a reference-exceeding value detecting circuit for detecting exciting current exceeding a threshold value and generating a resultant signal for resetting the flip-flops.

14. In an electromagnetic flow meter having: a pipe of non-magnetic and non-conductive material through which conductive fluid flows; a pair of electrodes which are provided oppositely on said pipe orthogonal to the flow direction of said fluid and in contact with said fluid; a magnetic circuit for introducing magnetic flux in the direction orthogonal to the flow direction and a straight line connecting said electrodes, an exciting coil for producing said magnetic flux to be introduced into said magnetic circuit; an exciting current generating unit for generating exciting current to be supplied to said exciting coil; and a fluid flow velocity calculating unit for calculating fluid flow velocity on the basis of the voltage produced between said electrodes due to said magnetic flux and the fluid flow; said electromagnetic flow meter comprising: a control unit for controlling said exciting current generating unit and said fluid flow calculating unit in such a manner that said exciting current generating unit intermittently produces said exciting current with an alternately reversed polarity and a short time duration and said fluid flow velocity calculating unit calculates the velocity of the fluid flow only during a predetermined constant period from a point in time when the residual flux retained by said magnetic circuit, after extinguishing said exciting current, reaches a stable state to a point in time when the subsequent exciting current is initiated, wherein said exciting current generating unit comprises a first fixed resistor with a large resistance value relative to said exciting coil, connected in series with said exciting coil; a capacitor; a normally open switch connected to said capacitor; a polarity inverting switch, both ends of a series connection of said capacitor and said normally open switch being connected to both ends of a series connection of said exciting coil and said first fixed resistor through said polarity inverting switch; a stabilizing DC power source; and a second fixed resistor with a high resistance value connected to said DC power source in series, said capacitor being connected in parallel with a series connection of said second fixed resistor and said DC power source; and said control unit controls said normally open switch and said polarity inverting switch with predetermined timings respectively in such a manner that a connection polarity of said polarity inverting switch is changed at a predetermined constant timing and said normally open switch is closed for a short time at an intermediate timing of said predetermined constant timing, wherein the cross section of said pipe is substantially rectangular at least in the vicinity of a location where said electrodes are disposed.

* * * * *

UNITED STATES PATENT AND TRADEMARK OFFICE
CERTIFICATE OF CORRECTION

PATENT NO. : 4,409,846

DATED : October 18, 1983

INVENTOR(S) : Kazuo Ueno

It is certified that error appears in the above-identified patent and that said Letters Patent is hereby corrected as shown below:

On the title page --

Delete Section [30] in its entirety.

Signed and Sealed this

Nineteenth Day of March 1985

[SEAL]

Attest:

DONALD J. QUIGG

Attesting Officer     Acting Commissioner of Patents and Trademarks